United States Patent [19]

Fabanich

[11] Patent Number: 4,991,849
[45] Date of Patent: Feb. 12, 1991

[54] GOLFING SPECTACLES

[76] Inventor: John P. Fabanich, 4301 Colorado Ave., Lorain, Ohio 44054

[21] Appl. No.: 451,634

[22] Filed: Dec. 18, 1989

[51] Int. Cl.⁵ .............................................. A63B 69/36
[52] U.S. Cl. ................................ 273/183 B; 351/158; 351/45; 351/128; 351/137; 273/183 E
[58] Field of Search ........... 273/183 B, 190 A, 183 E, 273/54 B, 190 R; 351/158, 45, 200, 203, 51, 52, 57, 58, 59; 128/76.5

[56] References Cited

U.S. PATENT DOCUMENTS

| | | | |
|---|---|---|---|
| 1,480,821 | 1/1924 | Henry | 351/128 |
| 2,045,399 | 6/1936 | McMurdo | 273/183 B |
| 3,228,696 | 1/1966 | Hull | 273/183 B |
| 3,264,002 | 8/1966 | Palumbo | 273/183 |
| 3,268,228 | 8/1966 | Novack | 273/183 |
| 3,871,104 | 3/1975 | Underhill, II | 33/262 |
| 4,531,743 | 7/1985 | Lott | 273/183 B |

Primary Examiner—George J. Marlo
Attorney, Agent, or Firm—Gustalo Nunez

[57] ABSTRACT

An improved golf aid which consists of a pair of shaded glasses having a slit horizontally located across both lenses and an adjustment assembly for moving the lenses toward and away from the golfer's eyes. The width of the slit is such that when the golfer has the glasses on, and is looking at the golf ball, he sees a defined path going from the golf ball to a target area. As the golfer looks down and addresses the ball, for example, when putting, he sees extending from the ball to the hole a clear path. The golfer will keep his head steady such that the path defined by the slits will define a fixed path from the golf ball to the target area and a fixed path for the golf club head to follow. The golfer will then stroke the golf ball in line with the path defined by the slits.

3 Claims, 3 Drawing Sheets

GOLFING SPECTACLES

BACKGROUND OF THE INVENTION

1. Field of the Invention

This invention is directed to a golfing aid which provides a golfer with means for lining up his shot, whether it be putting or driving, said golfing aid to be worn by the golfer as one would wear a pair of glasses.

2. Description of the Prior Art

U.S. Pat. No. 3,268,228 discloses conventional spectacles having apertures on each lens. The purpose of the spectacles is to insure that, when worn by a golfer, the golfer must keep his head down and in correct position to view the ball. The material of which the lenses are fabricated are opaque and, therefore, in the event the golfer moves his head from the correct position, he will lose sight of the ball.

U.S. Pat. No. 3,264,002 is directed to a golf putt alignment device and which discloses a pair of glasses having an opaque line imprinted across the transparent lenses. Also, this patent teaches that a linear element may be placed across the lenses.

U.S. Pat. No. 3,871,104 is related to an alignment sighting device for use in construction. The invention consists of a pair of hollow lenses which are secured in conventional eyeglass frames. Each lens has intersecting horizontal and vertical crosshairs imprinted thereon. The lenses, which are hollow, contain a colored liquid which is used in aligning the work piece at hand; e.g., for either horizontal or vertical alignment purposes, the top of the colored liquid must be brought into precise registration with the horizontal crosshair at which position the horizontal crosshairs will be precisely horizontal.

SUMMARY OF THE INVENTION

The present invention is directed to a golfing aid for use by golfers which comprises a pair of conventional looking glasses, excepting that the lenses on these particular glasses have a horizontal slit across the surface thereof, the slit being located across the lenses, or generally describing a plane which is parallel to the golfer's eyes. The slit is used to line the ball to the hole when putting, taking, of course, the characteristics of the green into account. The lenses are shaded such that when looking through the slits, one sees a clear path defined, and when the focus of the eyes move above or below the slit, all he sees is a shaded area. Once the ball is lined with the hole by use of the slits, all the golfer need do is stroke the ball along the path defined by the slits. Similarly, the glasses can be used for driving. Again, all the golfer need do is to line the ball with a target area on the fairway and to swing his club along that path, without letting the ball enter the shaded areas of the lenses, make contact with the ball and follow through.

DESCRIPTION OF THE PREFERRED EMBODIMENT

Figure 2:
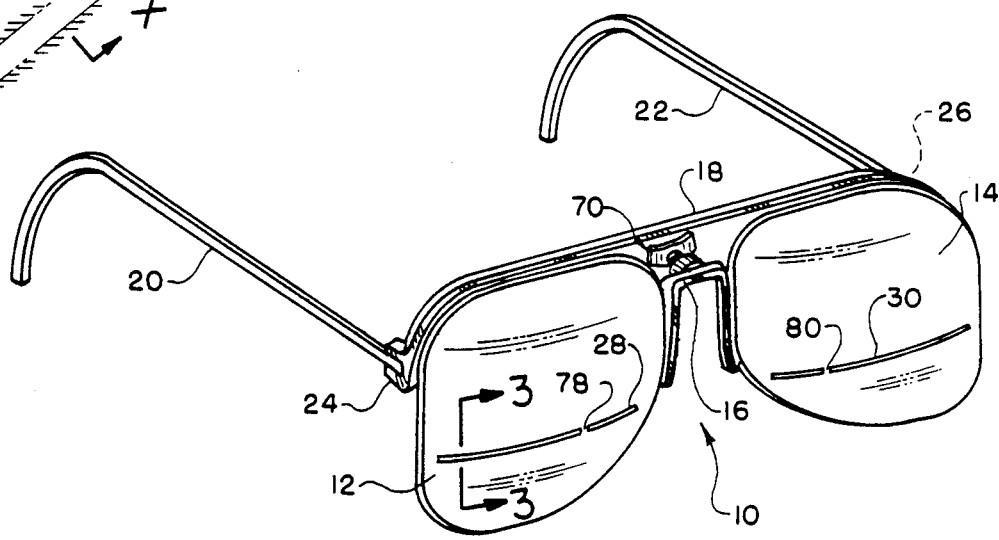
FIG. 2 is a perspective view of a pair of the invention glasses aligning guides in accordance with the present invention.

Referring to FIG. 2, there is illustrated a pair of glasses generally indicated at 10 which comprises two lenses 12 and 14 which may be fabricated from glass or plastic materials. The frames could also be fabricated of metal, plastic, etc. The glasses 10 further comprise a nose bridge member 16, a frame member 18 and a pair of temple members 20 and 22 which are hingedly connected to the frame member 18 at 24 and 26. These temple members could be also hingedly attached to the frames.

Figure 6:
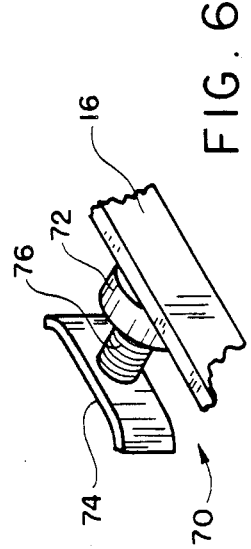
FIG. 6 is an enlarged view of the nose adjustment assembly.

The lenses 12 and 14 are translucent; therefore, sight through the lenses 12 and 14 is decreased. Located on the lenses 12 and 14 generally located on the middle to lower portion of the lenses, there is located an elongated slit 28 on the right lens 12 and an elongated slit 30 on the left lens 14. The slits 28 and 30 are generally across the complete lens surface in a direction generally parallel to the frame 18. As mentioned previously, the slits are located across a greater portion of the lens surface. The embodiment shown in FIG. 2 illustrates the slit 28 being segmented by lens surface 78. Similarly, the slit 30 is segmented by lens surface 80. The segments 78 and 80 are optional and may be deleted from the golfing spectacles which would leave a continuous slit on each lens surface 12 and 14. The purpose of this will be explained later. The nose bridge member 16 may be provided with means for vertically adjusting the lenses such that the slit 30 be placed in line with the golfer's eyes. Horizontal adjustment for distance from the nose is also incorporated. FIG. 6 illustrates the adjustment assembly 70 which includes a threaded barrel 72, a screw 76 which engages the barrel 72, and a nose piece 74. The nose piece 74 rests on the bridge of the user's nose. The barrel 72 is affixed to the nose bridge 16. The adjustment assembly 70 is used to move the glasses away from the user's eyes or closer to the user's eyes, depending on the user's preference. The golfing spectacles may be manufactured and used without the adjustment assembly 70; however, the adjustment assembly 70 facilitates the adjustment of the golfing spectacles 10 to the golfer's eyes.

Figure 3:
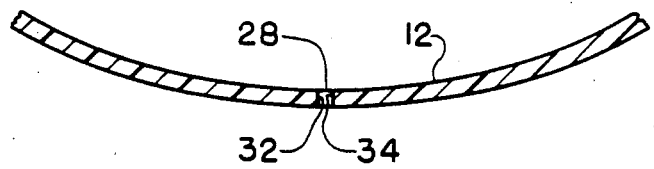
FIG. 3 is an enlarged cross-sectional view of the lens taken along lines 3—3 of FIG. 2.

Referring now to FIG. 3, there is illustrated an enlarged side view of the slit 28. The slit 28 is similar to the slit 30, hence reference will be made only to slit 28. It can be seen that the wall surfaces 32 and 34 of the slit 28 are parallel to each other and describe a longitudinal axis which traverses the lens 12. If desired, the wall surfaces 32 and 34 could be positioned such that they are at some angle, other than normal. This type of angled slit would tend to keep the focus of the user at an angle with respect to the ground surface.

Figure 1:
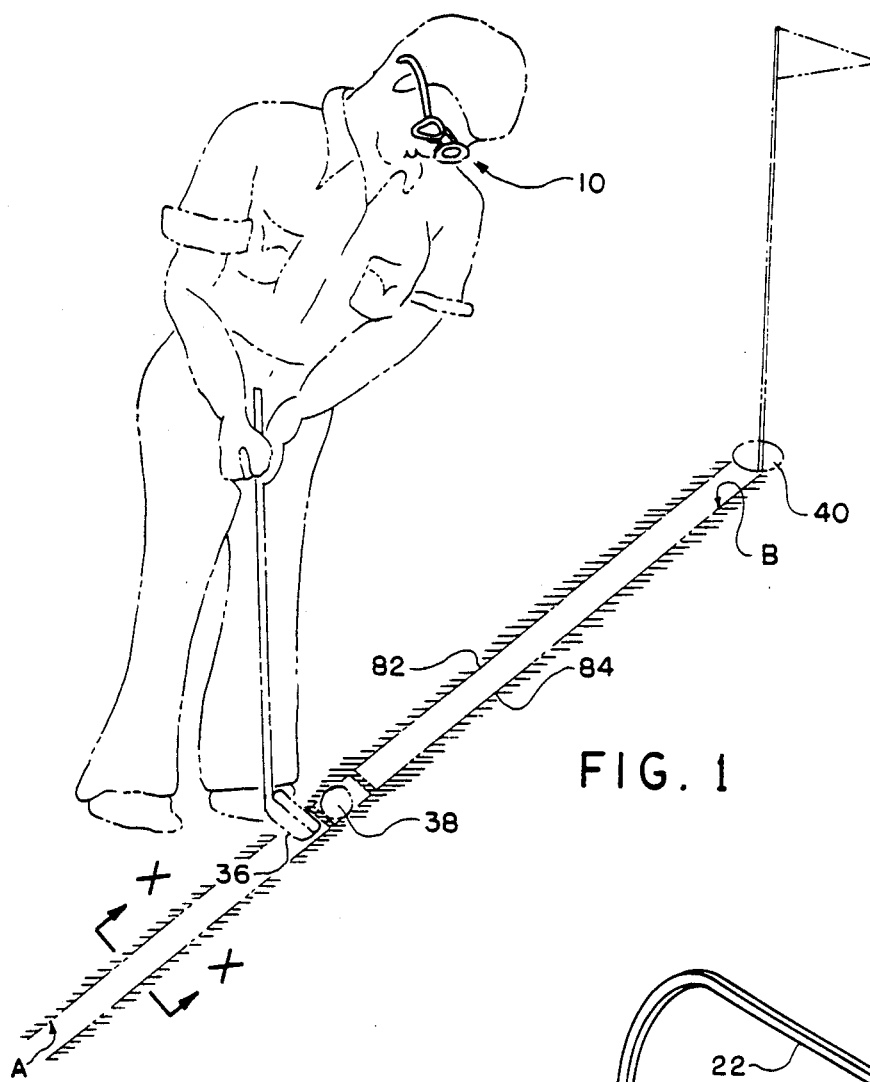
FIG. 1 is a pictorial view of a golfer using the invention for putting in accordance with the present invention.
Figure 4:
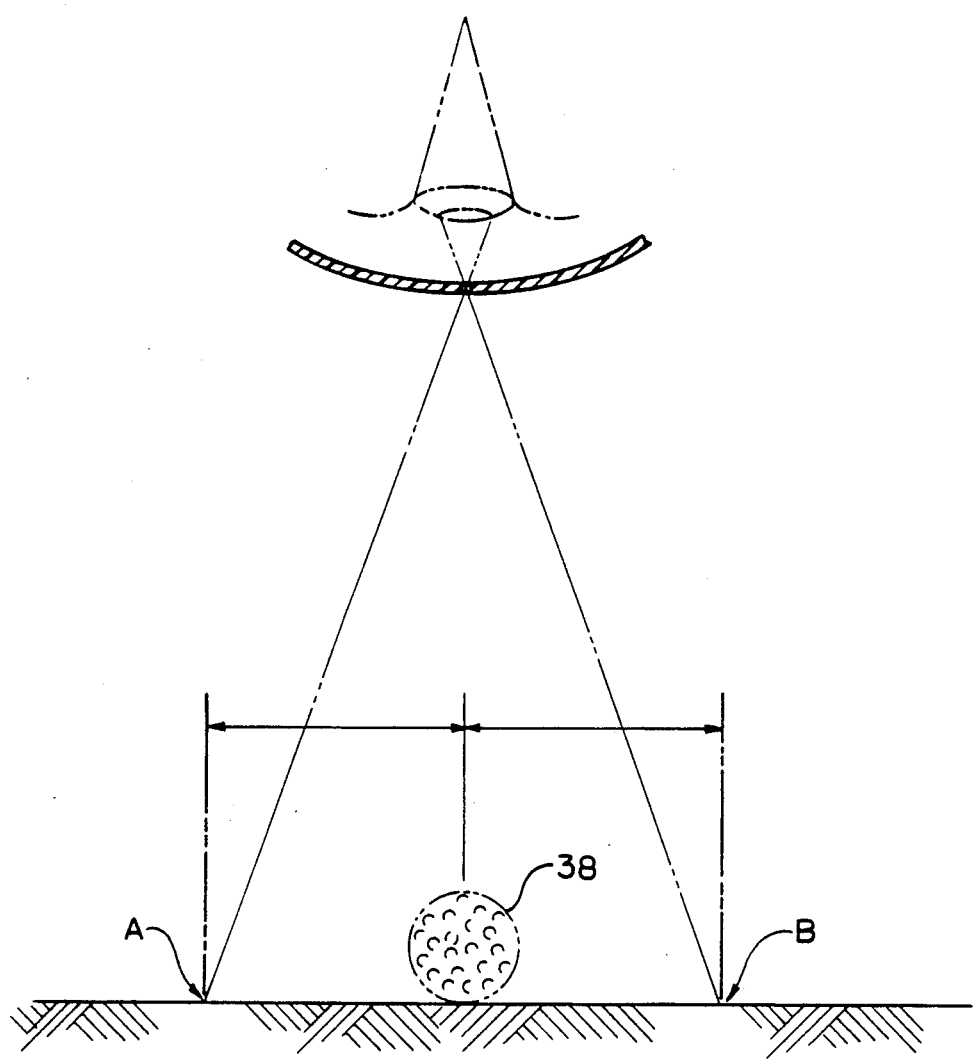
FIG. 4 is a view illustrating the path defined by the golfing aid when looking down at the golf ball in the direction of line x—x as shown in FIG. 1, which is used to control the direction of the golf swing in accordance with the present invention.

FIG. 4 illustrates the path A-B described as the user of these glasses looks down, which the golfer sees when using the golfing spectacles 10 and when looking in the direction of lines x—x of FIG. 1. The path A-B illustrated in FIG. 4 is what is seen through one eye. Quite obviously, this path A-B could be made much narrower simply by narrowing the sides of the slits 32 and 34. FIG. 1 also illustrates a golfer with the golfing glasses 10 on, ready to putt.

Figure 5:
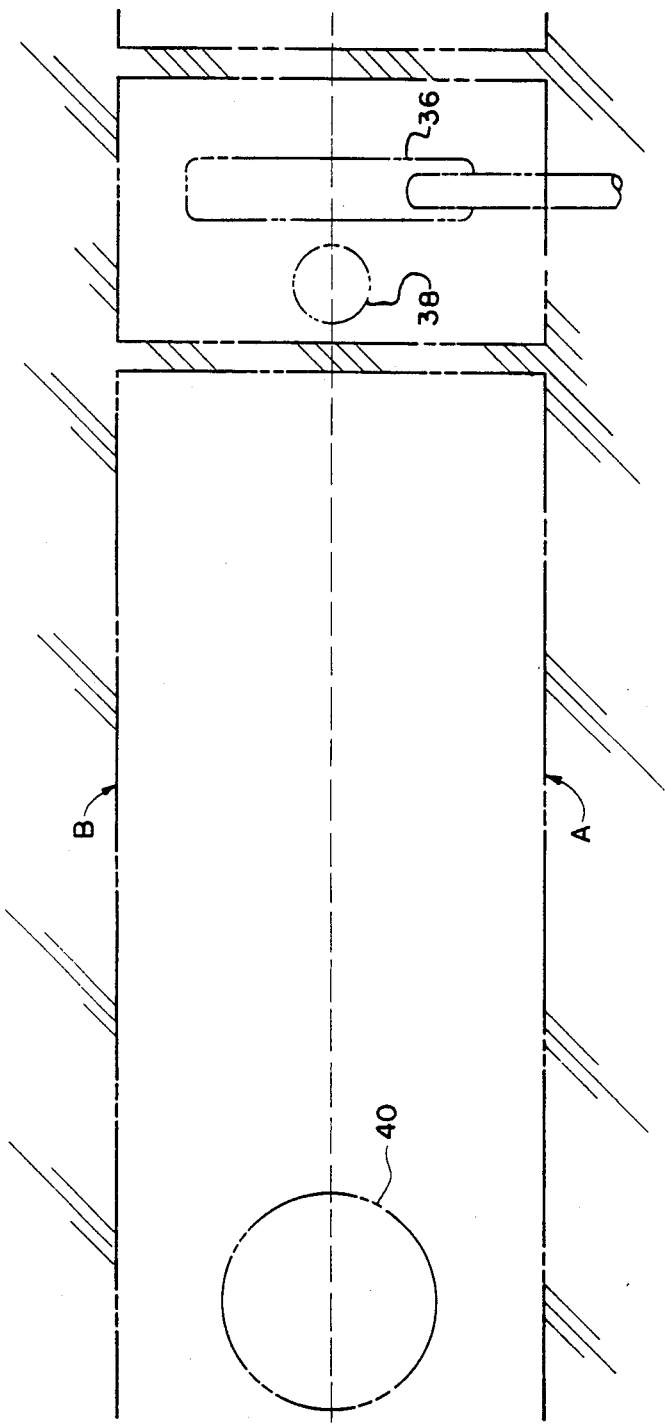
FIG. 5 is a view again illustrating the path defined by the golfing aid when looking down at the golf ball in a putting situation for controlling the direction of the golf swing and necessary follow through in accordance with the present invention.

The glasses 10 are worn by the golfer just as conventional glasses are worn. They are placed on the head and held in place by the temple members 20 and 22. As the golfer looks down at the golf ball 38, he sees what is illustrated in FIG. 5, which shows a putter 36 lined up to putt golf ball 38 into the hole 40. While looking down at the green surface, the golfer sees the path defined by A-B. The golfer strikes the ball 38 with the putter 36 in line with the path A-B which leads to the hole 40.

The slits 28 and 30, as illustrated, are cut onto the lens surface of lens 12 and 14; however, this need not be the case for in the process of applying shading to the lenses 12 and 14, the slits 28 and 30 may be masked such that the tinting will be applied to the entire lens surface excepting where the masking has been applied.

Having explained the construction of the golf glasses 10, the use of same will now be described. The present invention can be used for putting and can be used for driving the ball, whether it be a tee shot or a fairway shot. When putting, the golfer will line the ball with hole, taking into account the various characteristics of the green surface. Upon deciding at which direction to putt the ball, the golfer will place an imaginary line on the green. He will then putt using the imaginary line as his reference point. This system works well for the well-trained and disciplined golfer. But for the majority, they just cannot keep the imaginary line fixed in place.

Using the present invention, the line is placed on the green by the slits 28 and 30, remembering, of course, that the golfer will be looking through shaded lenses when he focuses away from the slits 28 and 30. The golfer simply selects his line, stands over the ball, places his line on the green by positioning the slits such that the line is where the golfer wants it, i.e. from the golf ball to the target object. The line will be seen as a clear path and at this point, the golfer will apply his putting stroke and putt the ball along the chosen line.

Again, when using the present invention for driving, the golfer will look down and address the ball, the clear area, i.e., the transparent area defined by the slits 28 and 30, will form a clear line on both sides of the ball and onto the designated target that you want to hit the ball to. As the golfer swings the club, the club head will approach the ball and make contact with the ball. As long as the ball 38 is kept in the clear area, the club head 36 will make contact with the ball 38 and the golfer will finish the swing with the proper follow through. In the event the ball 38, during the swing, is placed in the shaded area of the glasses 10, then in that event the golfer will either hit a hook or a slice. Therefore, the rule that must be followed when using the glasses 10 is to keep the ball and clubhead in the defined clear path for proper ball contact and for proper follow through. Another result from the use of the glasses 10 is that the golfer will learn to concentrate better, which also helps to lower the golf score. The above description applies to golfing spectacles that do not have the segmented surfaces 78 and 80. On those golfing spectacles that do, the golfer will see, when looking down at the ball 38, a golf ball which is enclosed in a clear box. The area outside of the box will be shaded. The shading framing the golf ball is illustrated in FIGS. 1 and 5. This clear box tends to help golfers to concentrate more intently by having the golf ball 38 accented by the clear box. The golfer now will have in his line of sight a clear path from the ball 38 to the target, as well as having the ball highlighted.

Although the golfing spectacles 10, as shown in FIG. 2, have only one slit and/or clear line per lens, the golfing spectacles could be made with a plurality of parallel slits per lens surface. This would allow the golfer to adjust the position of his head without the necessary of rearranging the golfing spectacles 10 about his head; adjustment would be made simply by choosing a slit and/or line more suitable to him. Of course, the golfer would have to discipline himself to the extent that he did not allow himself to be confused by the multiplicity of slits and/or clear lines on the lens surface.

The bridge 16 and temple members 20 and 22 may be fabricated from steel or plastic type materials, well known on the market. The lenses 12 and 14 may be held to the frame member 18 be well known adhesives or by other well known means such as a lens retainer which can be a metallic or plastic member which encircles the lens piece. The lens retainer may be an integral part of the frame 18.

The invention may be embodied in other specific forms without departing from the spirit thereof. The preferred embodiment is therefore to be considered in all respects as illustrative and not restrictive, the scope of the invention being indicated by the appended claims, rather than by the foregoing specification.

What I claim is:

1. A golfing spectacle to be worn by a golfer in aligning a golf ball with a target object comprising:
    a lens frame member,
    a pair of tinted translucent lenses, each lens provided with a horizontal clear line on the lenses surface thereon, said translucent lenses affixed to said lens frame member,
    wherein each horizontal clear line is terminated by said lens surface, each of said clear lines being located on each of said lens surfaces proximately adjacent to said nose piece, and
    an adjusting assembly for adjusting the distance from the lenses to the golfer's eyes, such that said golfer, when looking through said golfing spectacles, sees the golf ball through the horizontal clear lines inside of a frame defined by said tinted lens surface located on each lens, said frame extending from the golf ball to the target object, and
    said defined frame providing the golfer with greater means for concentration in lining the golf ball along said clear path, said clear path being the means by which the golfer lines the golf ball to the target object.

2. A golfing spectacle used by a golfer in lining a golf ball to a target object, comprising:
    a lens frame member,
    a pair of shaded lens surfaces, each lens surface having a plurality of clear lines defined thereon in a generally horizontal direction, said plurality of clear lines being in alignment with each other, and
    an adjusting asssembly for adjusting the lens surface in a direction to and from a golfer's eyes, such that said golfer, when viewing a golf ball through the golfing spectacles, views the golf ball on a path defined by said clear line, said clear line being used providing the golfer with greater means for concentration in lining the golf ball to said target object.

3. A golfing spectacle to be worn by a golfer in aligning a golf ball with a target object, comprising, a lens frame member, a pair of tinted translucent lenses, each lens provided with a horizontal slit on the lenses surface thereon, said translucent lenses affixed to said lens frame member, wherein each horizontal clear line is terminated by said lens surface, each of said slits being located on each of said lens surfaces proximately adjacent to said nose piece, and an adjusting assembly for adjusting the distance from the lenses to the golfer's eyes, such that said golfer, when looking through said golfing spectacles, sees the golf ball through the slits inside of a frame defined by said tinted lens surface located on each lens, said frame member extending from the golf ball to the target object, and said defined frame providing the golfer with greater means for concentration in lining the golf ball along said clear path, said clear path being the means by which the golfer lines the golf ball to the target object.

* * * * *